United States Patent
Moore, Jr. et al.

(10) Patent No.: US 9,511,245 B2
(45) Date of Patent: Dec. 6, 2016

(54) SAFETY HARNESS MONITORING AND ALERTING SYSTEM

(71) Applicant: International Business Machines Corporation, Armonk, NY (US)

(72) Inventors: John E. Moore, Jr., Brownsburg, IN (US); Jeffrey K. Price, Austin, TX (US); Robert R. Wentworth, Round Rock, TX (US); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/228,863

(22) Filed: Mar. 28, 2014

(65) Prior Publication Data

US 2015/0276521 A1  Oct. 1, 2015

(51) Int. Cl.

| | |
|---|---|
| *A62B 35/00* | (2006.01) |
| *G06K 19/07* | (2006.01) |
| *G01W 1/02* | (2006.01) |
| *G01L 5/04* | (2006.01) |
| *E06C 7/00* | (2006.01) |
| *B60R 21/015* | (2006.01) |
| *G08B 21/02* | (2006.01) |

(52) U.S. Cl.
CPC ........... *A62B 35/0075* (2013.01); *A62B 35/00* (2013.01); *G01L 5/04* (2013.01); *G01W 1/02* (2013.01); *G06K 19/0717* (2013.01); *B60R 21/01516* (2014.10); *E06C 7/003* (2013.01); *G08B 21/0288* (2013.01)

(58) Field of Classification Search
CPC .......... H04L 12/24; G06F 7/00; B66F 17/006; B66F 11/0044
USPC ....................................................... 715/202
See application file for complete search history.

(56) References Cited

U.S. PATENT DOCUMENTS

| | | | |
|---|---|---|---|
| 7,106,205 B2 | 9/2006 | Graef et al. | |
| 7,463,142 B2 * | 12/2008 | Lindsay | ................... A61B 5/00 340/539.12 |
| 7,825,770 B2 | 11/2010 | Postelwait et al. | |
| 8,325,053 B2 | 12/2012 | Flynt et al. | |
| 8,408,360 B2 | 4/2013 | Postma | |

(Continued)

FOREIGN PATENT DOCUMENTS

| | | |
|---|---|---|
| EP | 2508461 A1 | 10/2012 |
| JP | 11267237 A | 10/1999 |

(Continued)

OTHER PUBLICATIONS

Kelm et al., "Mobile passive Radio Frequency Identification (RFID) portal for automated and rapid control of Personal Protective Equipment (PPE) on construction sites", Automation in Construction 36 (2013) 38-52, Elsevier, <www.elsevier.com/locate/autcon>.

(Continued)

*Primary Examiner* — Leon-Viet Nguyen
(74) *Attorney, Agent, or Firm* — Stephen M. Darrow; Brian M. Restauro

(57) ABSTRACT

Receiving machine-readable information about an anchor point, analyzing that information to determine if connecting a load to the anchor point would be safe, and reporting the results of this analysis to a user.

11 Claims, 4 Drawing Sheets

(56) References Cited

U.S. PATENT DOCUMENTS

| | | | |
|---|---|---|---|
| 8,482,401 B2 * | 7/2013 | Morino | A62B 35/0075 340/532 |
| 2008/0106413 A1 | 5/2008 | Rohlf | |
| 2010/0097181 A1 | 4/2010 | Sorensen et al. | |
| 2010/0117787 A1 * | 5/2010 | Postelwait | B66C 1/12 340/5.1 |
| 2010/0289657 A1 | 11/2010 | Ocasio | |
| 2011/0103558 A1 | 5/2011 | Hooten | |
| 2012/0050036 A1 | 3/2012 | Landry et al. | |
| 2012/0217091 A1 | 8/2012 | Baillargeon et al. | |
| 2012/0286949 A1 | 11/2012 | Worthington et al. | |
| 2013/0038263 A1 * | 2/2013 | Faucher | A61G 7/1042 318/434 |
| 2013/0057391 A1 | 3/2013 | Salvador et al. | |
| 2013/0137292 A1 | 5/2013 | Abuelsaad et al. | |
| 2013/0199854 A1 | 8/2013 | Bagnaro | |
| 2013/0314210 A1 | 11/2013 | Schoner et al. | |

FOREIGN PATENT DOCUMENTS

| | | |
|---|---|---|
| JP | 2010094375 A | 4/2010 |
| WO | 0108940 A1 | 2/2001 |
| WO | 2009126541 A1 | 10/2009 |

OTHER PUBLICATIONS

"RFID Range and the Things That Affect It", Copyright 2008—2014 Wireless-Technology—Advisor.com, Website last updated Nov. 2013, <http://www.wireless-technology-advisor.com/rfid-range.html>.

"Sample Fall Protection Program", Revised Aug. 2000, pp. 1-19, <http://www4.uwm.edu/pps/Usaa/SAFETY/FALLPROTECTION/smpl_fall_protect_prog.pdf>.

"Crosby's Patented RFID Inspection System", Real Life Solutions, The Crosby Group, Included in Post Disclosure Sep. 26, 2013, <http://www.thecrosbygroup.com/Portals/0/docs/NewProducts/9992200.pdf>.

* cited by examiner

SAFETY HARNESS MONITORING AND ALERTING SYSTEM

BACKGROUND OF THE INVENTION

The present invention relates generally to the field of fall protection equipment, and more particularly to safety harnesses for accident prevention.

Currently, workers in construction, electrical service, and other areas connect safety harnesses to mount points to prevent injury in case of a fall. These mount points are assumed safe, but may not take into account many factors that may cause them to be unsafe under certain conditions.

There are several types of mount points, also known as anchor points or anchorage. These include, but are not necessarily limited to: (i) fixed anchors that are mechanically or chemically affixed in a permanent fashion to a solid structure; (ii) temporary, transportable anchor devices such as clamps, straps, braces, and tripods; (iii) anchor devices employing rigid rails or flexible lines in any orientation, such as horizontal or vertical lifelines and rigid track/rail systems; and (iv) deadweight anchors which remain in a fixed location by virtue of their weight and mechanical friction. In addition, anchors may be secured to fixed structures, such as a building or tower, or they may be secured to mobile reference points, such as lifts, utility vehicles, or helicopters.

Radio-frequency identification (RFID) is the wireless non-contact use of radio-frequency electromagnetic fields to transfer data. RFID readers automatically identify and track RFID tags attached to objects. The tags contain electronically stored information. Readers and tags may be passive or active, and have effective ranges of a few inches to hundreds of yards. RFID tags do not necessarily need to be within line of sight of the reader, and may be embedded in the tracked objects.

SUMMARY

According to one aspect of the present disclosure, there is a computer program product, system and/or method which performs the following actions (not necessarily in the following order and not necessarily in serial sequence): (i) receives machine-readable information about an anchor point; (ii) determines, based at least in part on an analysis of the machine-readable information about the anchor point, if connecting a load to the anchor point would be safe; and (iii) reports the results of this determination to a user.

DETAILED DESCRIPTION

Figure 1:
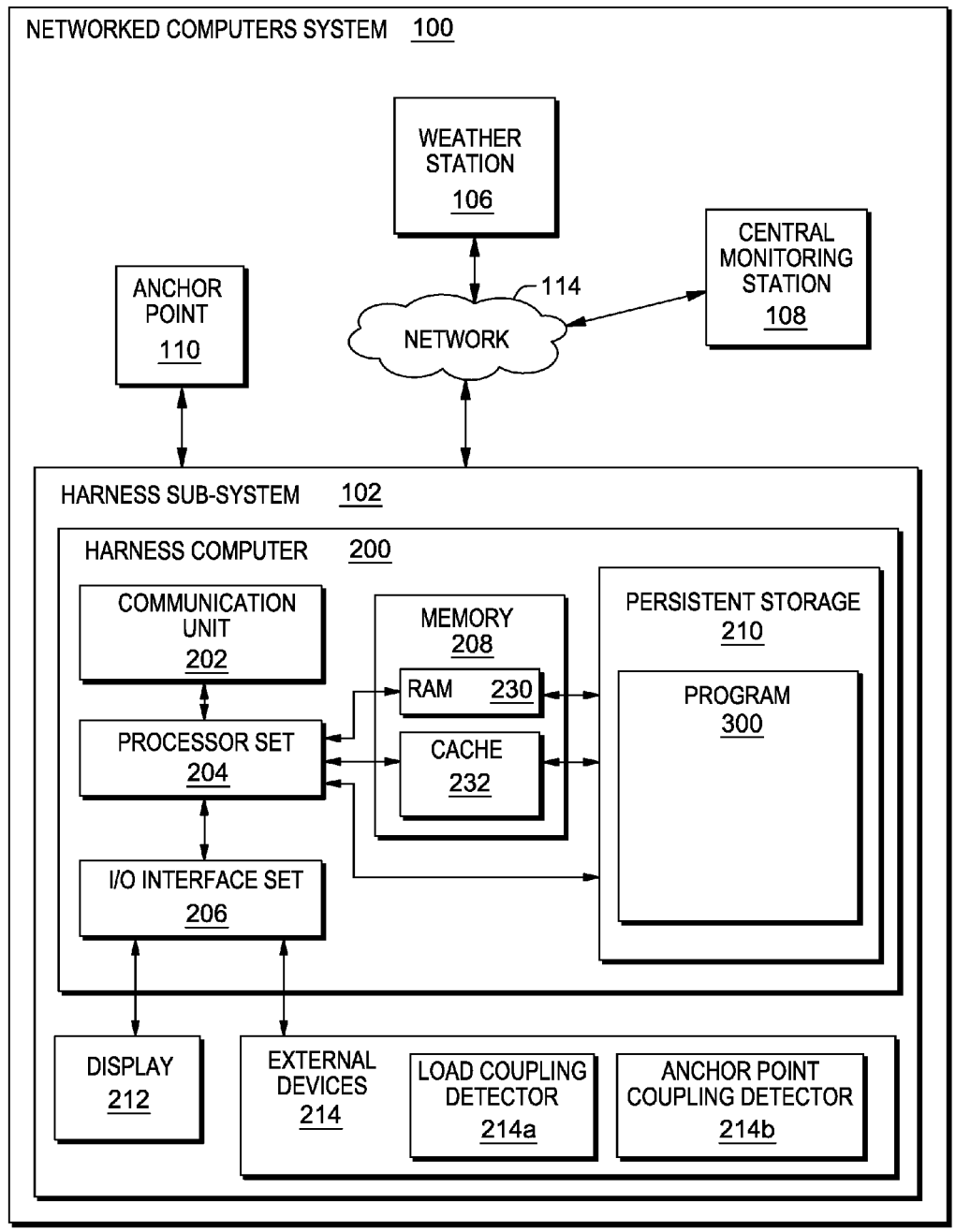
FIG. 1 is a schematic view of a first embodiment of a system according to the present invention.

A safety harness monitoring and alerting system that includes the ability to verify and track harness mount point safety—where persons or objects may be safely "clipped in"—by monitoring weight, height, and/or other mechanical and environmental factors such as wind and temperature, and reporting on such monitoring such as by sending monitoring information back to a central tracking authority via wireless signals. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: harness sub-system 102; weather station 106; central monitoring station 108; anchor point 110; communication network 114; harness computer 200; communication unit 202; processor set 204; input/output (I/O) interface set 206; memory device 208; persistent storage device 210; display device 212; external device set 214, including load coupling detector 214a and anchor point coupling detector 214b; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computer sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
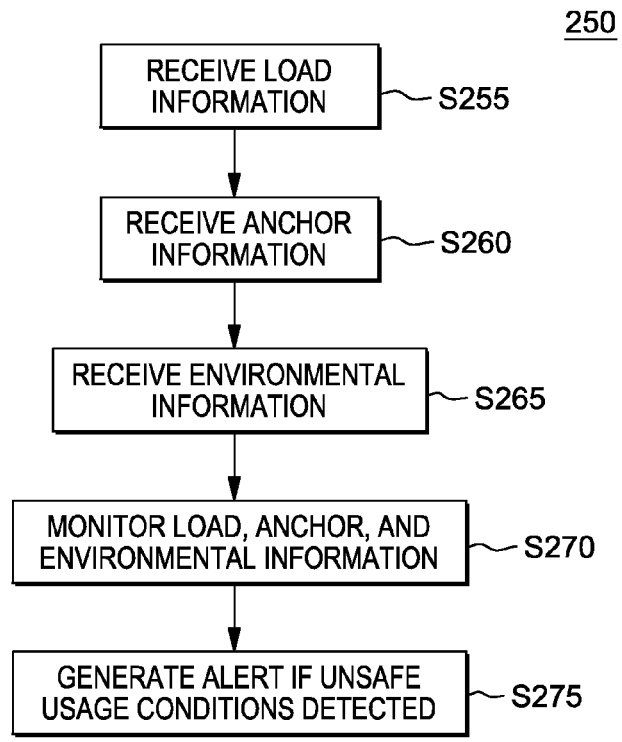
FIG. 2 is a flowchart showing a method performed, at least in part, by the first embodiment system.
Figure 3:
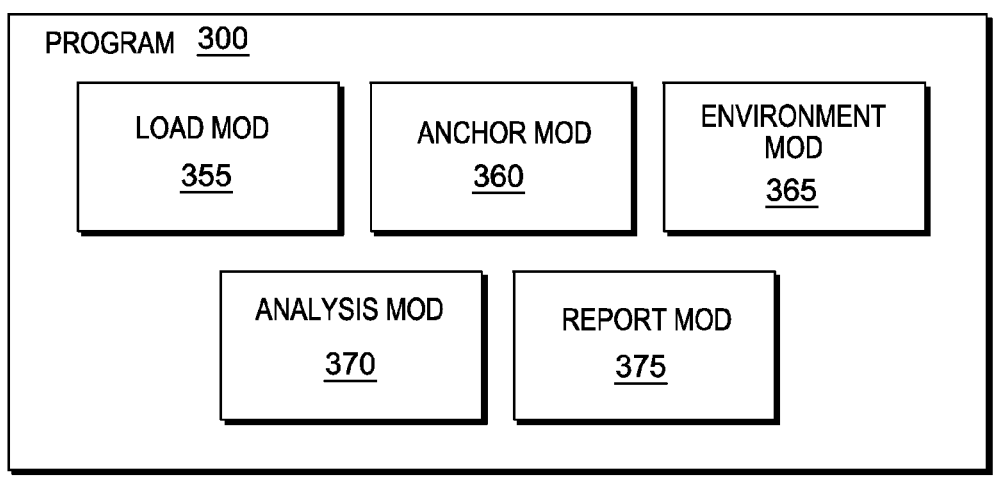
FIG. 3 is a schematic view of a machine logic (for example, software) portion of the first embodiment system.
Figure 4A:
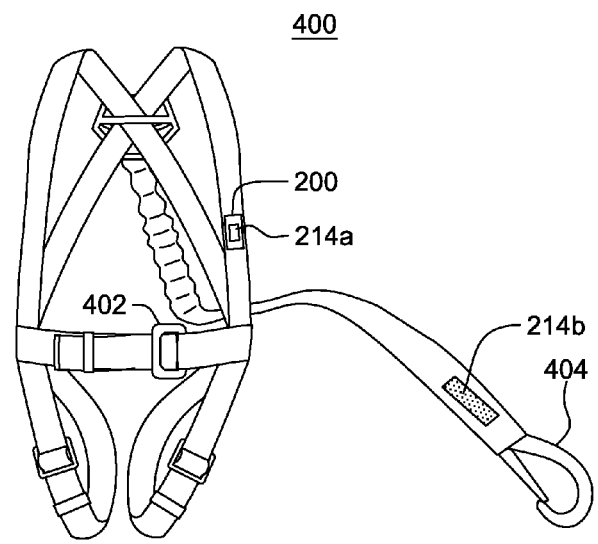
FIG. 4A is an illustration of a harness used with the first embodiment system.

FIG. 4A shows harness 400 according to one embodiment of the present invention. Harness 400 includes: fastener buckle 402; anchor coupler 404; harness computer 200 (see also FIG. 1); load coupling detector 214a; and anchor point coupling detector 214b. FIG. 2 shows flowchart 250 depicting a method according to the present invention, used in conjunction with harness 400. FIG. 3 shows program 300 of harness computer 200 for performing at least some of the method steps of flowchart 250. This method and associated software will now be discussed, over the course of the following paragraphs, with extensive reference to FIG. 2 (for the method step blocks), FIG. 3 (for the software blocks), and other Figures as specifically mentioned.

Figure 4B:
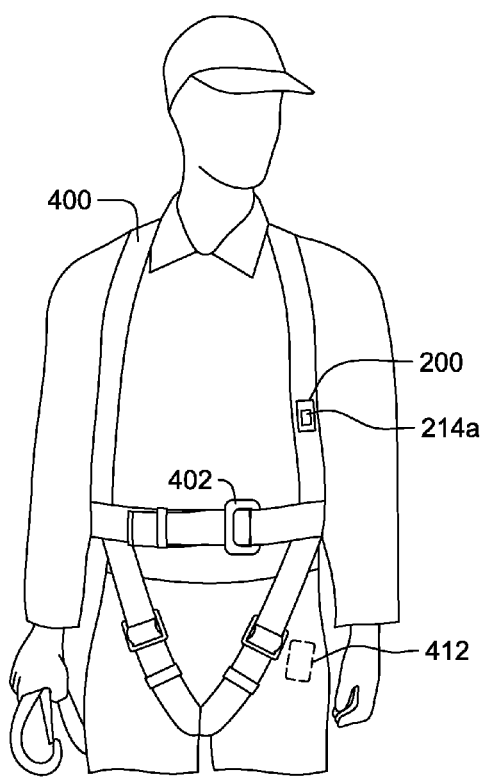
FIG. 4B is a first illustration of the harness in use with the first embodiment system.

Processing begins at step S255, where load mod ("mod") 355 receives information about the load for which harness 400 is being used. As shown in FIG. 4B, the load is a person, whose pertinent information is encoded on ID card 412. The information includes employee weight. Harness computer 200 reads the information on ID card 412 through load coupling detector 214a, which is activated by the closing of fastener buckle 402. Alternatively or in addition, load information may be obtained in other ways, such as via manual entry into harness computer 200, via a check-in device that measures information such as weight, or, using only a detected ID, via a lookup request to local persistent storage or to a data store at central monitoring station 108 (see FIG. 1).

In some embodiments, load information may include height, weight, ID number, and/or other information about an individual. In some embodiments, load information may be adjusted to implicitly account for "worst case" conditions like extra clothing or protective gear that may be donned or extra tools that may be carried; in other embodiments, such information may be obtained explicitly via, for example, properly encoded RFID tags attached to each accoutrement. In cases where the load is an object rather than a person, load information may include item ID, physical dimensions, weight, description, and/or other information about the object. Load information may also include information about the harness itself. In general, load information may include information such as weight from which safety information may be derived, as well as direct safety information such as a maximum force rating.

Figure 4C:
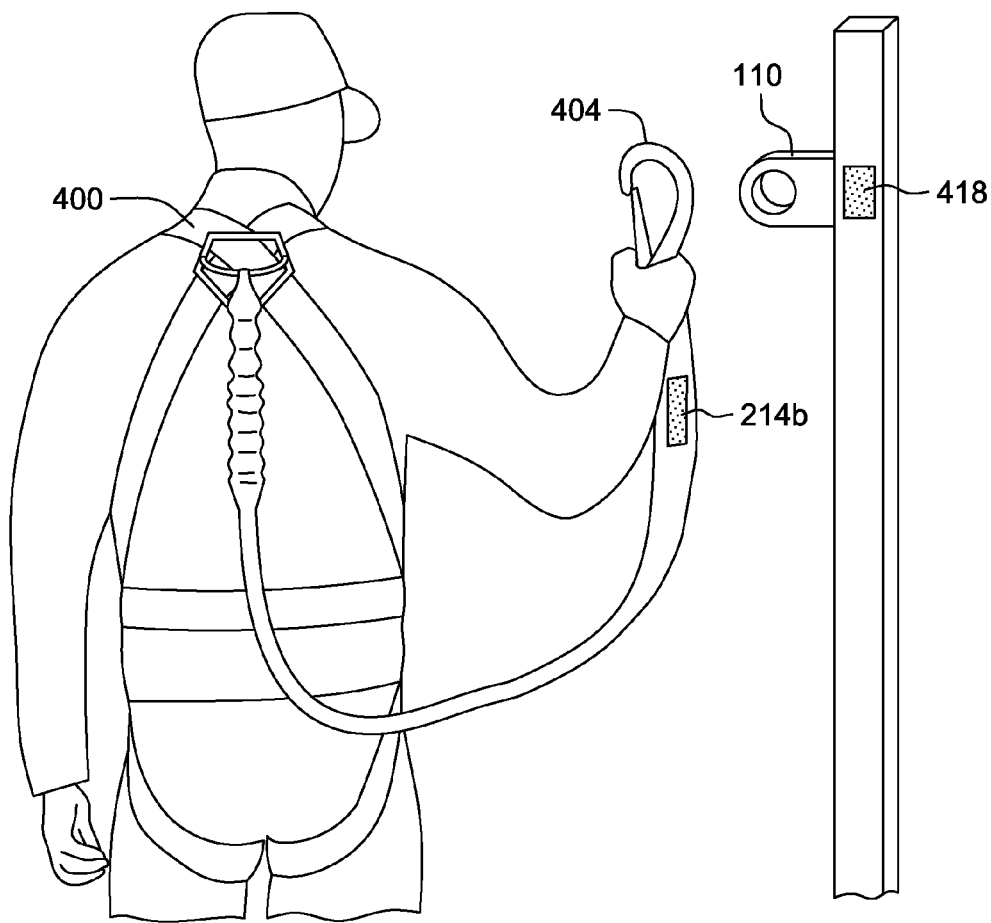
FIG. 4C is a second illustration of the harness in use with the first embodiment system.

Processing proceeds to step S260, where anchor mod 360 receives information about an anchor point to which harness 400 is attached. This step is triggered by anchor point coupling detector 214b being brought into close proximity to anchor point 110, as shown in FIG. 4C. More specifically, anchor point coupling detector 214b includes an RFID reader that receives information about anchor point 110 when brought into close proximity to anchor point information store 418, which is an RFID tag located on or in operationally close proximity to anchor point 110. In cases where the anchor point is a line- or rail-type system, anchor point information stores may be located at entry/egress points of the system and/or periodically along its length. Alternatively or in addition, other types of contact and/or non-contact sensors may be used by an anchor point coupling detector to determine attachment of a harness to an anchor point or anchorage system.

Anchor point information store 418 stores and transmits information about anchor point 110 via RFID signals. In general, the anchor point information store and the RFID component of the anchor point coupling detector may be any operationally effective combination of RFID signaling and reading devices, such as a passive RFID tag for the anchor point information store and an active reader for the RFID component of the anchor point coupling detector. More generally still, any operationally effective combination of contact or non-contact signaling and reading devices may be used, including manual entry of an anchor point ID into harness computer 200.

The information stored and transmitted by anchor point information store 418 includes anchor point ID number; inspection date, status, and expiration; load capacity data; and height above ground. In some embodiments, the information may include other location data or other structural or safety-related data about the anchor point. For example, in some embodiments, the anchor point may be equipped to detect load, and may store time-stamped load information in its associated local information store. If a load is detected that exceeds some threshold value, it may change its inspection status to "expired" to signal that the anchor point should be inspected for possible damage induced by the excessive load before the anchor point is used again. In general, anchor point information may include information such as material type from which safety information may be derived, as well as direct safety information such as a maximum load rating.

In general, the harness and/or anchor point may or may not be connected to a broader network. In some embodiments, only the ID number of the anchor point is retrieved from the anchor point data store, and other information is obtained via a lookup request to local persistent storage on the harness or to a data store at another location on the broader network.

Processing proceeds to step S265, where environment mod 365 receives information about the environment in which harness 400 is being used. This information includes temperature, humidity, and wind data from local weather station 106 (see FIG. 1), as well as storm warnings. In some embodiments, other weather data may be obtained from public or private weather stations or from sensors built into the harness or harness computer. Environmental data may also include any other relevant data about the environment, such as the locations of other people or objects in the vicinity of harness 400, which information may be obtained by, for example, a stand-alone or augmented GPS system.

Processing proceeds to step S270, where analysis mod 370 analyzes the load, anchor point, and environmental information available to it and, based on this analysis, decides whether or not to generate an alert via step S275 and report mod 375. The information is updated periodically (such as in the case of wind speed) or upon the occurrence of triggering events (such as when a new anchor point coupling is detected).

There are many situations in which alerts are generated. For instance, when a user attempts to attach harness 400 to an anchor point whose data indicates that the most current inspection results have expired, analysis mod 370 will generate an alert. Similarly, if the anchor point data indicates a load rating less than the weight harness computer 200 has registered for the load (or, alternatively, less than the force that would be generated in case of a fall), analysis mod 370 will generate an alert. As another example, anchor point data may indicate a load rating compatible with load weight, but at some point after the harness is connected to the anchor point, these values combined with an increasing wind speed and the height above ground of the anchor may cause analysis mod 370 to issue an alert.

In some embodiments where information is available on the relative locations of load and harness (and perhaps other objects as well), the analysis mod may conduct swing-fall hazard analysis. Likewise, in embodiments where harness lanyard elasticity and length data is available, that data may be analyzed along with additional data such as load weight and anchor point height to determine whether use of that anchor point under those circumstances would prevent contact with the ground in case of a fall. In addition, some embodiments may have the ability to connect to multiple anchor points simultaneously, and to adjust safe usage calculations accordingly. Those of skill in the art will recognize that these are just a few examples of the multitude of possible scenarios in which the teachings of this disclosure may be applied.

Processing proceeds to step S275, where report mod 375 issues any alert generated by analysis mod 370. These reports are issued both to the harness user in the form of an audible and visual alert notice as well as to central monitoring station 108 (see FIG. 1). In some embodiments, periodic or real-time reporting may also be provided to a central monitoring station or other location so full status information is available at all times regarding all current assets with activated harnesses. In some embodiments, the harnesses contain only sensors and the ability to report a hazard condition, while collection of other data (such as environmental data) and analysis of all data takes place at a remote location.

III. Further Comments and/or Embodiments

Some embodiments of the present invention recognize the following facts, potential problems and/or potential areas for improvement with respect to the current state of the art: (i) safety harness mount points are often assumed safe, but may not take into account many factors, such as height, weight, temperature, wind speed, and so on that may cause them to be unsafe under certain conditions; (ii) there may be a need to track employee progress through mount points, as well as current status at all times, to maintain a safe work environment; and/or (iii) there is a need to inspect connection points for structural soundness and fatigue.

Furthermore, some embodiments of the present invention recognize that: (i) beyond having a supervisor or controller visually check to see where their employees are and if they are hooked up, there is no system available that would do this automatically; (ii) this problem is exacerbated in the case of electrical service workers or others who may be working miles from any central control station; and (iii) there is currently no system that can gauge the safety of a mount point for an individual based on mechanical, environmental, and individual parameters such as wind speed, anchorage material, or height of the individual.

Some embodiments of the present invention involve a system to track and ensure the safety of workers' safety harness connections throughout a work area. This system takes into account mechanical and environmental parameters in analyzing the safety level of each individual mount point in the work environment while also tracking the current status of every individual employee (like whether an employee is connected to or disconnected from a mount point). Mechanical properties may include, but are not limited to: (i) mount point material; (ii) composition; (iii) anchorage; and/or (iv) elasticity. Environmental parameters may include, but are not limited to: (i) humidity; (ii) temperature; (iii) wind speed; (iv) altitude; (v) height above base plane; (vi) height of the individual employee; and/or (vii) weight of the individual employee.

In some embodiments of the present invention, data is stored on the connection point. This data describes items such as (i) the last time the connection point was inspected; (ii) who inspected the connection point; and/or (iii) inspection expiration information. The information may then used by the system in a variety of ways, such as to warn the user that the data is out of date and that the connection point should therefore be deemed unsafe. Structural integrity information could then be gathered by an inspector.

Some embodiments of the present invention use a disconnected (that is, non-contact) technology such as wireless techniques like radio-frequency identification (RFID) to track an individual employee via a connection between a monitoring device carried by the employee or incorporated directly into the safety harness, and a central tracking system on the ground, for instance at a tracking station. In some embodiments, the device may be connected directly to the safety harness or may be otherwise able to communicate with it, in which case additional monitoring of the condition of the harness itself can be performed.

Some embodiments of the present invention will constantly monitor and track an employee's progress through a work environment, and will alert a controller of any unsafe conditions. In some embodiments, the controller will also be able to map the location of one or more employees at any point in time, or over time. In some embodiments where all parameters are fed into a central tracking system, safety can be maintained at a much higher level than current processes and systems allow.

Some embodiments of the present invention may include one, or more, of the following features, characteristics and/or advantages: (i) automatic monitoring of the safety status of individual resources; (ii) disconnected (for example, wireless) monitoring of individual resources; (iii) tracking of all individuals in a work environment in real time (either localized, as in a construction project, or geographically dispersed, as in the case of electrical support personnel); and/or (iv) the ability to track and use multiple environmental, mechanical, and individual properties and parameters in real time.

Some embodiments of the present invention recognize that the ability to distinguish between multiple connection points within close proximity to one another could be a potential problem. With multiple connection points in close enough proximity, an RFID signal may not be able to distinguish between the points and therefore could not be used to identify the specific connection point to which the harness is connected.

Some embodiments of the present invention solve this problem through the use of a passive RFID transmitter at the mount point on a fixed safe point. The RFID distance for a passive RFID transmitter can be as little as 2-3 inches. For example, the harness carabiner can be made an active reader such that as it gets "locked into" a safe point, the safe point RFID (passively) broadcasts its ID (information that could include where that safe mount point is, the time at which it's read, and so forth). Positive affirmation of a safe mount can then be detected at that point, such as in the form of a light or audible sound from the carabiner for the person locking in. If the carabiner never gets locked in at that point, that safe point RFID will not broadcast.

Some embodiments of the present invention solve this problem in the context of a longer cable run that is a safe mount point, for example on a bridge, using passive RFID tags at both the "hook in point" and the "unhook point". The harness carabiner registers the connection at the hook-in and unhook points using the passive RFIDs at those points, and can slide along the run when hooked in. If the carabiner is unhooked somewhere other than at one of those specifically marked points, the carabiner registers the event as a non-safe hook up and provides visual/audible feedback to the person using the harness, as well as sending a message to a supervisor.

Another approach, used by some embodiments of the present invention, is to attach a second wire to the long cable run. The second wire has a signal that is passed along its entire length. For example, the signal may be broadcast on one end and bounced back at the other. The unique ID of the signal is read by the carabiner much like a clamp meter (such as a power meter or energy analyzer) reads an electrical signal today when looped around a signaling wire that has current. (This approach to cable identification was disclosed in United States Patent Application Publication US 2013/ 0137292 A1, Abuelsaad et al., "Cable Identification Using a Unique Signal Carried on an External Conductor", May 30, 2013, which is incorporated herein in its entirety by reference.)

Some embodiments of the present invention recognize that it may be necessary or desirable to identify times when the harness is being worn but is not in use, such as during breaks. The issue here is related to having the ability to distinguish when a user is in a danger zone and unsafe usage should be signaled, and stopping the harness from signaling unsafe usage when the user is actually in a safe zone.

This problem is solved by some embodiments of the present invention by installation of a connection point with an RFID built into the harness. When the harness is not being used, the carabiner can be connected to the connection point on the harness, which identifies it as not being used. This allows the user to have a safe connection point controlling the loose end while identifying the connection. Alternatively or in addition, there may be an activation/deactivation point on the site, such as a gate or portal a user must walk through upon entering or exiting a work area. As the harness enters the work area/danger zone, it activates the harness; on exit of the zone, it deactivates the harness. Yet another alternative employed in some embodiments of the present invention is tracking of the harness location via elevation or other sensor-based systems that allow the system to identify when the harness is located within a danger zone. When the harness is determined to be outside the work area or danger zone, signals are ignored.

In some embodiments of the present invention, configuring and using the harness monitoring system in done in three stages. First, before work begins, the following configuration takes place: (i) all possible connection points at a job site are examined and labeled with RFID or a similar system emitting strength characteristics (load capabilities), inspection date, expiration date, and other such information useful for evaluating safety; and (ii) an environmental monitor/weather station to measure wind speed, temperature, humidity and related information is placed at the job site and set to broadcast associated information, or, alternatively, monitoring is performed via a trusted local weather source.

Second, a user configures the harness/tether as follows: (i) the harness requires the user to enter height/weight information before putting system on, or, alternatively, information on the user's height and weight are pulled from the user's employee identification card or an employee database, using, for instance, an RFID-like system; (ii) if the user puts the system on without inputting the necessary data, the system provides a warning; (iii) the harness starts capturing information from the weather station; and (iv) the harness waits for the connector at the end of the tether to be activated.

Third, the user attaches the harness/tether to a connection point. This triggers the following actions: (i) a proximity reader on the connection end of the tether reads the RFID-type system of the connection; (ii) if the connection point does not provide required information or the inspection data is out of spec, the harness will warn the user; (iii) the harness continually receives input regarding changing weather conditions; (iv) the system compares the connection information on the one hand against the personal data entered together with environmental/weather information on the other, and generates a warning when conditions hit unsafe levels; and (v) the harness also transmits this information to an audit log in a central location for management/supervisor safety evaluations and employee tracking.

Some embodiments of the present invention may include one, or more, of the following features, characteristics and/or advantages: (i) provide monitoring, alerting, and tracking of safety conditions of connections by individual personnel to hard mount points as the individuals move through a work environment, such as a construction site or roof top, where users have access to a multitude of possible connection points; (ii) provide warnings when a connection point is not appropriate for the specific use and/or user; (iii) are adaptive, using conditions at any point in time to determine the safety of the individual personnel attaching to mount points as they pass through the work environment; (iv) monitor changing conditions of the environment and combine these with the parameters of the individual personnel themselves to determine whether the connection of the work harness will be safe; (v) pass back real-time information to a system available to supervisors as to the location, connection, and safety status of all personnel in the environment; (vi) pro-active monitoring, alerting, and tracking of all personnel in real time; (vii) take changing conditions such as wind speed, humidity, temperature, and so on in the work environment into account; (viii) reducing or eliminating the need for reactive safety devices by preventing accidents due to unsafe mount conditions; (ix) monitor the integrity of a mount point and environmental conditions to keep an individual safe; (x) identify which mount point(s) a user is connected to; (xi) identify safe mount points; (xii) track the safety of the individual, his or her mount points, and/or the safety of connected mount points to mitigate the risk of a fall; (xiii) monitor the mount points; (xiv) know where/how the harness is connected to the mount points; and/or (xv) provide intelligence as to the integrity of a mount point and/or environmental conditions.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
receiving, by one or more computer processors, via a safety harness worn on an individual, information about an anchor point, information about a load for the anchor point, and environmental information for which the anchor point and the load for the anchor point are used,
wherein information about the anchor point comprises anchor point type, mechanical properties of the anchor point, chemical properties of the anchor point, physical properties of the anchor point, and attachment points associated with the anchor point,
wherein the information about the load for the anchor point comprises height, weight, ID number associated with the load, and physical properties associated with the load,
wherein environmental information for which the anchor point and the load for the anchor point are used comprises temperature data, humidity data, wind data, and storm warning data,
wherein the safety harness worn on the individual communicates with a central station, and
wherein the central station monitors safety of individuals wearing the safety harness;
responsive to receiving, by one or more computer processors, information about the anchor point and the load for the anchor point, determining whether adequate safety measures are met based on an analysis of the information about the anchor point, the information about the load for the anchor point, and the environmental information; and responsive to determining that adequate safety measures are not met, generating, by one or more computer processors, a real-time report based, on the determination that adequate safety measures are not met, and transmitting, by one or more computer processors, the report to the safety harness and the central station, wherein the report includes an alert and an identified hazard condition information associated with the anchor point and about the load for the anchor point.

2. The method of claim 1 wherein the anchor point information includes inspection information.

3. The method of claim 1 wherein reception of the information occurs, at least in part, via radio frequency identification technology.

4. The method of claim 1 wherein the anchor point is secured to a fixed structure.

5. A computer program product comprising a computer readable storage medium having stored thereon:

first program instructions programmed to receive, via a safety harness worn by an individual, information about an anchor point, information about a load for the anchor point, and environmental information for which the anchor point and the load for the anchor point is used,
wherein information about the anchor point comprises anchor point type, mechanical properties of the anchor point, chemical properties of the anchor point, physical properties of the anchor point, and attachment points associated with the anchor point,
wherein the information about the load for the anchor point comprises height, weight, ID number associated with the load, and physical properties associated with the load,
wherein environmental information for which the anchor point and the load for the anchor point are used comprises temperature data, humidity data, wind data, and storm warning data,
wherein the safety harness worn on the individual communicates with a central station, and
wherein the central station monitors safety of individuals wearing the safety harness;

second program instructions programmed to, responsive to receiving information about the anchor point and the load for the anchor point, determine whether adequate safety measures are met based on an analysis of the information about the anchor point, the information about the load for the anchor point, and the environmental information; and third program instructions programmed to, responsive to determining that adequate safety measures are not met, generating, by one or more computer processors, a real-time report based, on the determination that adequate safety measures are not met, and transmitting, by one or more computer processors, the report to the safety harness and the central station, wherein the report includes an alert and an identified hazard condition information associated with the anchor point and about the load for the anchor point.

6. The product of claim 5 wherein the anchor point information includes inspection information.

7. The product of claim 5 wherein reception of the information occurs, at least in part, via radio frequency identification technology.

8. The product of claim 5 wherein the anchor point is secured to a fixed structure.

9. A computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive, via a safety harness worn by an individual, information about an anchor point, information about a load for the anchor point, and environmental information for which the anchor point and the load for the anchor point is used,
wherein information about the anchor point comprises anchor point type, mechanical properties of the anchor point, chemical properties of the anchor point, and physical properties of the anchor points, and attachment points associated with the anchor point,
wherein the information about the load for the anchor point comprises height, weight, ID number associated with the load, and physical properties associated with the load,
wherein environmental information for which the anchor point and the load for the anchor point are used comprises temperature data, humidity data, wind data, and storm warning data,
wherein the safety harness worn on the individual communicates with a central station, and
wherein the central station monitors safety of individuals wearing the safety harness;
second program instructions programmed to, responsive to receiving information about the anchor point and the load for the anchor point, determine whether adequate safety measures are met based on an analysis of the information about the anchor point, the information about the load for the anchor point, and the environmental information; and
third program instructions programmed to, responsive to determining that adequate safety measures are not met, generating, by one or more computer processors, a real-time report based, on the determination that adequate safety measures are not met, and transmitting, by one or more computer processors, the report to the safety harness and the central station, wherein the report includes an alert and an identified hazard condition information associated with the anchor point and about the load for the anchor point.

10. The system of claim 9 wherein the anchor point information includes inspection information.

11. The system of claim 9 wherein reception of the information occurs, at least in part, via radio frequency identification technology.

* * * * *